Oct. 27, 1964 W. T. RENTSCHLER ETAL 3,153,996
PHOTOGRAPHIC SHUTTER CONSTRUCTION
Filed Feb. 28, 1961 4 Sheets-Sheet 3
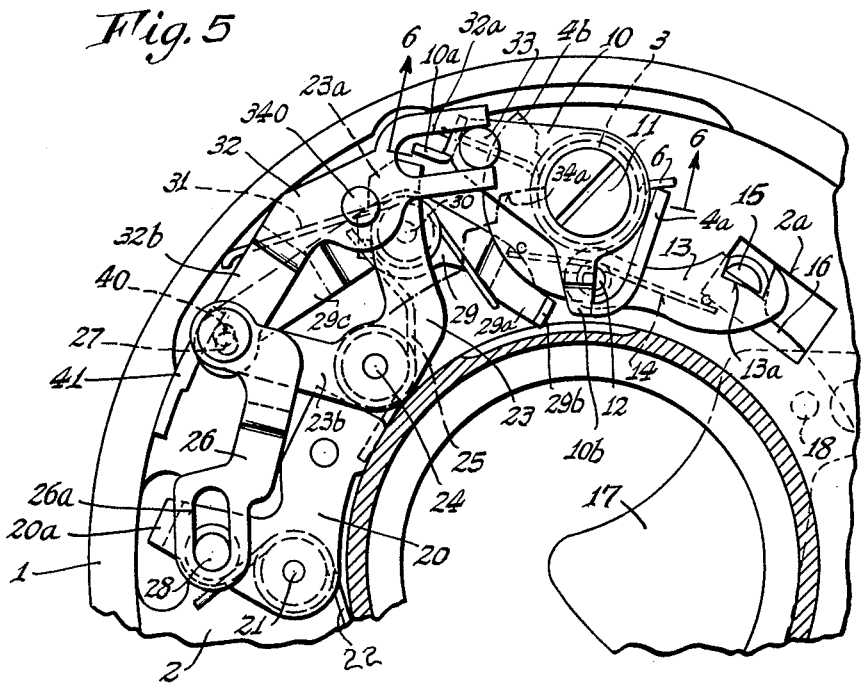
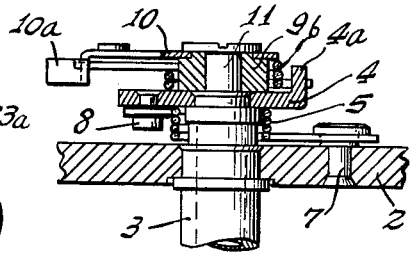
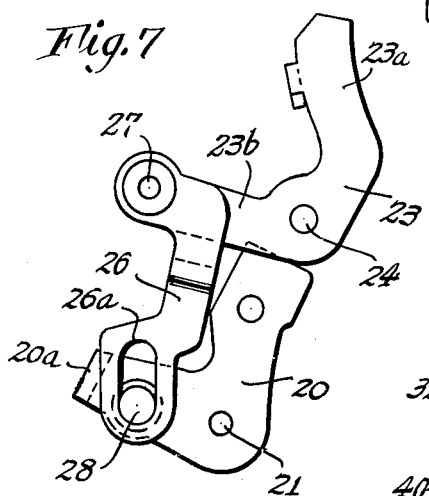
INVENTORS
Waldemar T. Rentschler
& Franz W. R. Starp
BY March and Curtiss
ATTORNEYS INVENTORS
Waldemar T. Rentschler
& Franz W. R. Starp
BY March and Curtiss
ATTORNEYS 3,153,996
PHOTOGRAPHIC SHUTTER CONSTRUCTION
Waldemar T. Rentschler and Franz W. R. Starp, Calmbach (Enz), Germany, assignors to Alfred Gauthier, G.m.b.H., Calmbach (Enz), Germany, a corporation of Germany
Filed Feb. 28, 1961, Ser. No. 92,249
Claims priority, application Germany Mar. 2, 1960
4 Claims. (Cl. 95—63)

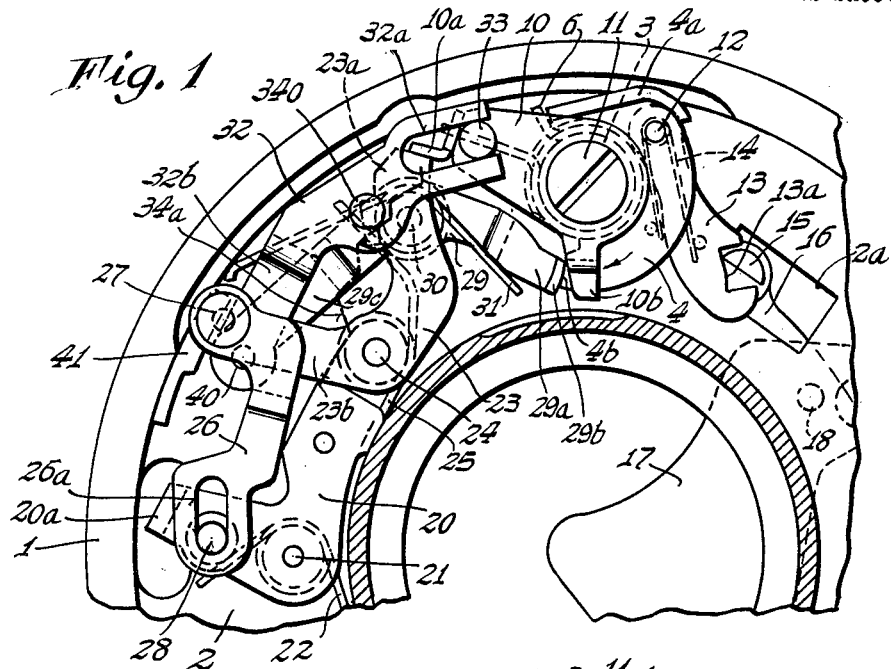

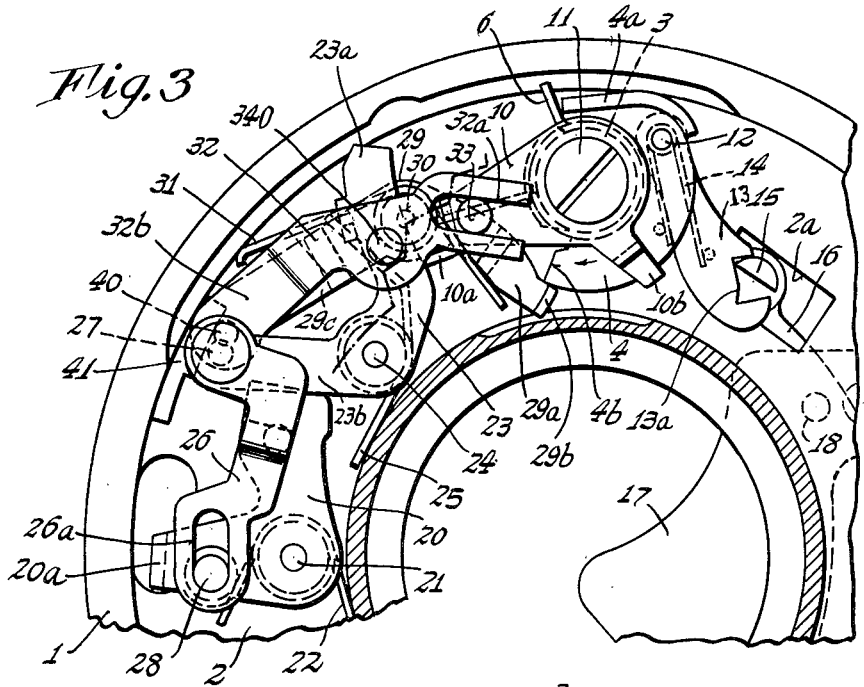
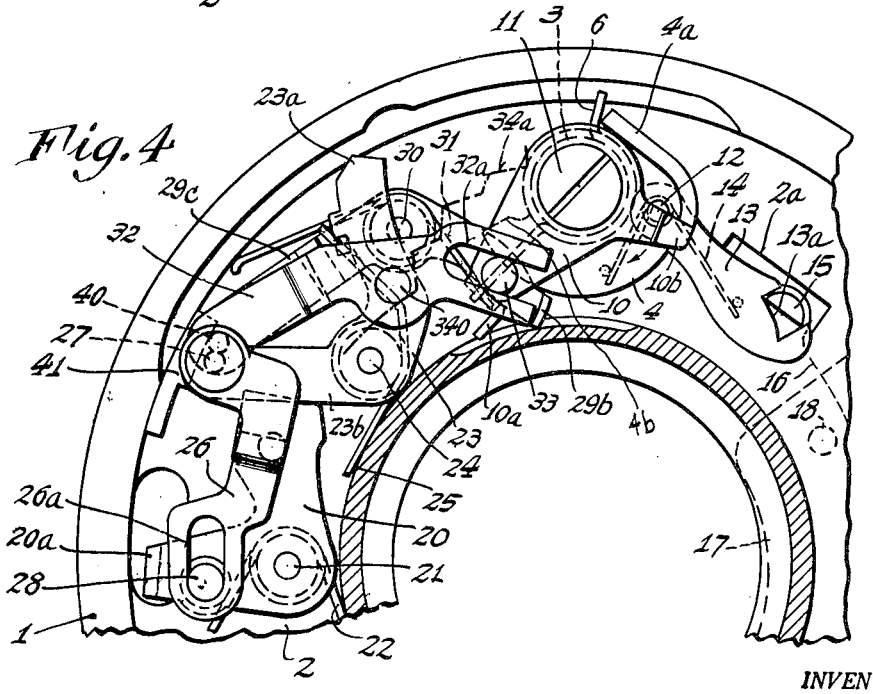

This invention relates to photographic shutter structures of the type having a shutter driving member arranged to be selectively driven either by a main spring alone or else jointly by said main spring and an auxiliary spring. In cameras having a photographic shutter construction of this type a movable abutment member for the auxiliary spring is provided, which member is retained in a starting position corresponding to the maximum stressed condition of the auxiliary spring when the shutter driving member is in cocked position. Such retention is effected by a releasable device or mechanism (hereinafter also termed a "releasable retainer means") which is releasable prior to the release of the shutter driving member. In the arrangement provided, after the releasable retainer means has been released or rendered inoperative, the movable abutment is shifted into one of a number of different adjusted positions which are defined or controlled by the adjusted position of a setting member having a stepped control edge or setting cam.

Photographic shutters of this kind have the advantage that the setting or adjustment of the setting member which cooperates with the abutment provided for the auxiliary spring can be effected without any influence being exerted thereon by such spring, wherefore the required moment of adjustment for shifting the setting member can always be maintained at a low, uniform value for all settings of the member.

A further advantage resides in the fact that the reinforced or augmented driving force acts on the driving member and in consequence upon the entire shutter blade drive mechanism only at the desired settings, so that the shutter drive mechanism is exposed otherwise to the least possible stresses or loads. Shutters of this type are further distinguished by the fact that the stress of the auxiliary spring which acts on the driving member is variable and may be adjusted or regulated to various values.

For the purpose of insuring the proper method or sequence of operations in the control, it is necessary in shutters of the above type to correlate the release of the abutment for the auxiliary spring and the release of the driving member for the shutter in such a manner that the abutment attains its desired adjusted positions as determined by the setting member always prior to release of the driving member for running down movement of the shutter.

An object of the present invention is to provide a novel and improved shutter construction of the above described kind, which has all of the mentioned advantages yet wherein the correlation of the adjustment of the abutment for the auxiliary spring with the release of the driving member of the shutter is effected in an uncomplicated, expenditure-saving or economical, functionally dependable manner which will not adversely affect or make more difficult the operation of the shutter.

The invention solves this problem by utilizing the release movement of the shutter or camera release, to render inoperative the releasable retainer means which holds the abutment for the auxiliary spring in its starting position, and by providing a novel pivotally movable setting and actuating member which swings about several different axes and which is drivingly connected to the abutment, pivotally mounting such actuating member and hingedly connecting it to the latch which retains the driving member of the shutter in its cocked position. The said setting and actuating member is arranged to determine or control the adjusted position of the abutment, this being effected by means of a stop which is affixed to the setting and actuating member and which impinges on a setting cam or stepped edge of the camera "speed" setting member. After such stop has impinged on the setting cam under the influence of the auxiliary spring, the setting and actuating member is shifted through a different pivotal or swinging path of movement still under the action of the auxiliary spring, now pivoting about the said stop as an axis, during which second pivotal movement the latch is actuated to release the driving member of the shutter for its running down action. There is further provided a fixed stop which, after the release of the shutter driving member has been effected, prevents further pivotal movement of the said setting and actuating member.

A shutter as thus constructed in accordance with the invention has the advantage that the release of the shutter drive member is always, and in a positive manner, effected directly after the adjustment or adjustable positioning of the abutment for the auxiliary spring (as defined by the adjusted position of the setting member) has been completed.

This mode of operation produces, on the one hand, an optimal functional dependability of the device and on the other hand effects the smallest possible release time for all of the settings. Moreover, this improved mode of operation is obtained, in a shutter constructed in accordance with the invention, in a surprisingly simple manner by the use of a setting and actuating member which, during the setting movement of the abutment for the auxiliary spring, carries out under the action of said spring a movement which does not influence or actuate the latch for the shutter drive member. Instead, the setting movement of the abutment results in the impingement of a stop connected with it on the setting cam of the setting member, after which and only after which a different pivotal movement of the actuating member takes place about the said stop as an axis. During such later pivotal movement the latch for the shutter drive member is actuated and rendered inoperative, whereby the shutter is released for its running down movement. Thus, in obtaining the above mentioned desirable correlation between the adjusting movement of the abutment for the auxiliary spring and the release of the drive member for the shutter, the control device as constructed in accordance with the invention does not require any special synchronizing means, wherefore there is obtained by the invention a highly simplified structure involving relatively few components and permitting a compact and space-saving arrangement to be had. In addition, the control device has the advantage that its construction involves no special requirements as regards the shutter or camera release, as well as the driving means of the shutter, wherefore the invention has a wide field of applications and range of use.

Another object of the invention is to provide an improved, camera shutter construction of the above described kind, wherein neither special nor additional actuating devices nor additional operational manipulations are required in order to move or restore the abutment of the auxiliary spring from its operative or adjusted position as determined by the adjustment of the setting member to its cocked or starting position which is associated with the maximum stressed condition of the auxiliary spring.

The invention solves this problem by the provision, between the abutment for the auxiliary spring and the driving member of the shutter, of a uni-lateral or uni-directional separable driving connection by means of which the abutment can be returned during the running down movement of the driving member, from its respective adjusted or operative position as determined by the setting member, into the said starting position corresponding to the maximum stressed condition of the auxiliary spring.

This arrangement, in a surprisingly simple manner not requiring any substantial additional expenditure, provides for a desirable, automatic return or restoration of the abutment from its adjusted operative position into its starting position. The mode of operation of such separable driving connection is such that the driving member of the shutter, having been actuated under the action of the main spring and also the auxiliary spring, first experiences a relative motion with respect to the abutment of the auxiliary spring. Having travelled through a specific extent of movement the size of which depends on the respective adjusted position of the abutment, the driving member makes operative the separable driving connection between it and the abutment, whereby the two members now move as a unit under the action of solely the main driving spring into a run down position (of the driving member) which corresponds to the uncocked condition of the shutter and wherein the abutment is returned to the said starting position. This produces the additional advantage that the energy required for shifting the unit constituted of the abutment and the auxiliary spring is deducted from the impact energy (which is detrimental to the life of the shutter drive mechanism) of the driving member and the shutter blades, upon the shutter drive reaching its inoperative position.

This produces, by virtue of the novel release-control device as provided by the invention, a photographic shutter of the initially described kind wherein there is an optimally uncomplicated and expenditure-saving structure involving a mode of operation which embraces or includes the basic method employed with shutters not having auxiliary springs, and further effects a functionally dependable new mode of operation.

An embodiment of the invention is illustrated in the figures, wherein:

FIG. 1 is a fragmentary front view partly in elevation and partly in vertical section, on an enlarged scale, of a portion of a photographic intra-lens shutter structure with the cover plate removed. Arranged in the shutter housing is a release or control device as provided in accordance with the invention, correlating the action of the abutment for the auxiliary spring and the shutter driving member. There is further shown a novel, separable, unilateral driving connection as provided by the invention between the abutment and the driving member. FIG. 1 further shows a fragment of the setting cam of the setting member, which cam cooperates with the auxiliary-spring abutment and determines the adjusted or operative position of such abutment. The shutter is shown in its cocked position.

FIG. 2 is a view similar to that of FIG. 1, but illustrating the position of the parts immediately after release of the shutter drive member has been effected. The abutment for the auxiliary spring has attained its adjusted, operative position as determined by the control cam of the setting member, and has further effected release of the driving member of the shutter. The latter is shown at the beginning of its running down movement.

FIG. 3 is a view like that of FIGS. 1 and 2, illustrating the positions of the components immediately after release as in FIG. 2 but showing a different adjusted position of the abutment, as effected by the control cam being placed in a different setting.

FIG. 4 is a view similar to that of FIGS. 1, 2 and 3 but showing still another setting of the control cam which governs the adjusted operative position of the abutment for the auxiliary spring. The components of the shutter are illustrated in the positions they occupy when the shutter blades are fully opened, at an intermediate point in the running down movement of the shutter drive mechanism. The separable, unilateral driving connection between the shutter drive member and the abutment for the auxiliary spring is just becoming operative, in order to return the abutment to the starting position shown in FIG. 1.

FIG. 5 is a view similar to those of the preceding figures, but illustrating the shutter drive mechanism in its fully run-down state. The abutment for the auxiliary spring has been returned by means of the said separable driving connection to its starting position which effects the greatest stress or tension of the auxiliary spring when the shutter is in cocked condition.

FIG. 6 is a fragmentary sectional view taken on the line 6—6 of FIG. 5. This figure shows the main driving spring and the auxiliary driving spring, as well as the shutter driving member and the abutment for the auxiliary driving spring.

FIG. 7 is a fragmentary detail, enlarged and in elevation, showing the means responsive to operation of the camera or shutter release, for rendering inoperative the retainer means which retains the abutment in its starting position.

FIG. 8 is a fragmentary detail, enlarged, showing in elevation the latch member for retaining the shutter driving member in its cocked position, and further showing the pivotally movable actuator member which is hingedly connected to the said latch and arranged to be drivingly connected with the abutment for the auxiliary spring.

Figure 9:
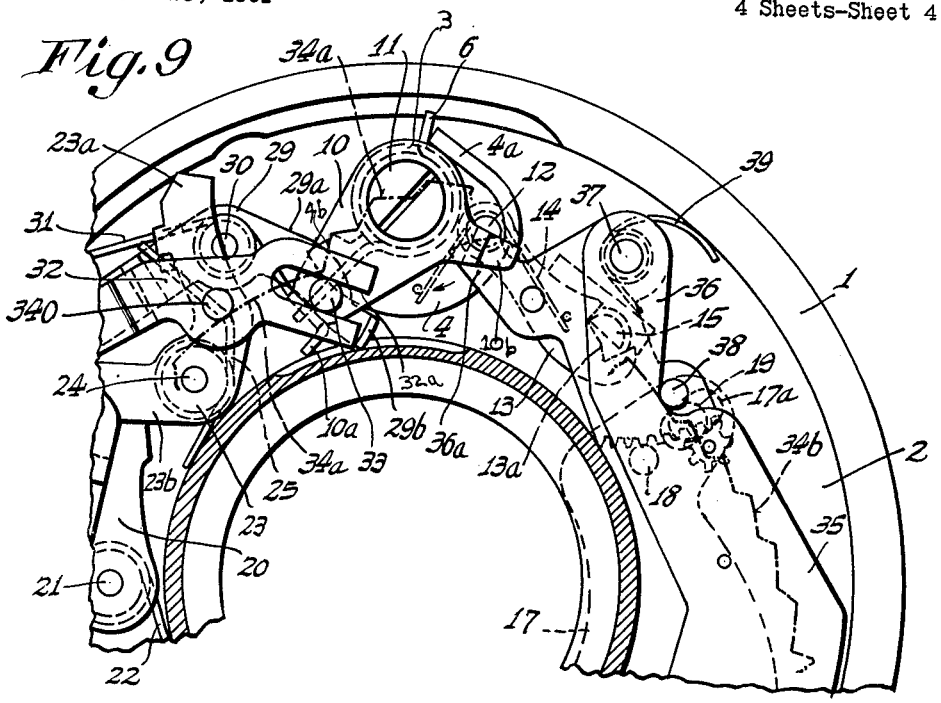
FIG. 9 is a fragmentary view similar to the showings of FIGS. 1–5, illustrating the cooperation of the shutter drive member with an exposure-time escapement mechanism which is settable by a stepped abutment or cam edge provided on the setting member.

Referring now to FIGS. 1–5 and 9, the housing of the photographic intra-lens shutter construction is indicated by the numeral 1. Affixed in the housing 1 in a well-known manner is a shutter base plate 2, which serves to position the shutter mechanism, as is well understood. More particularly, the shutter construction shown includes a cocking and driving disk 4 for the shutter, positioned about an axis 3 turnably mounted on the shutter base plate 2. A main shutter drive spring 5 is disposed about the axis 3 for the purpose of driving the shutter drive disk 4. Also, there is an auxiliary spring 6 operatively connected with the drive disk 4, such auxiliary spring being variable as to its pre-stress, thereby to provide an adjustable driving force on the disk. The spring 5 is coiled about the shaft 3, which latter constitutes the cocking shaft for the driving disk 4 and passes through the rear wall of the shutter housing for this purpose. The spring 5 at one end engages a fixed pin 7, and at its other end engages a pin 8 which is affixed to the driving disk 4 (FIG. 6). The auxiliary spring 6, which is arranged about a spacer or bushing 9 located above the driving disk 4, has one end engaged with a bent portion or lug 4a of the driving disk, and has its other end engaged with a rotatable member 10 arranged coxially with the driving disk and hereinafter called an "abutment." A cap screw 11 threaded into the cocking shaft 3 serves to secure the abutment 10 in place. The abutment 10 is retained in a starting position (FIGS. 1 and 5) which correspond to the condition of greatest stress of the auxiliary spring 6 when the shutter is cocked by a releasable retainer means (to be described below) which is released or rendered inoperative prior to the release of the driving disk 4. The said starting position of the abutment 10 is shown in FIG. 1 as being maintained by the releasable retainer means, whereas in FIG. 5 it has been effected by driving engagement between the lug 4a of the driving disk and an arm or projection 10b of the abutment. After release of the abutment has been effected by a counterclockwise turning movement of the releasable retainer means 23 (see FIGS. 1 and 7) it moves under the action of the auxiliary spring 6 into an adjusted position defined by the particular setting of a setting member comprising a cam and cam edge (indicated by a fragmentary showing labeled 34a in FIGS. 1–5). The abutment 10 reaches vertically its adjusted operative position prior to the release of the driving disk 4, as provided by the invention, and the procedure by which this is effected will be described in detail below.

Connected with the driving disk 4 is a driving link 13, pivotally mounted on the disk by means of an axis 12. The link 13 has a notch 13a arranged to receive a semicircular pin 15 which is affixed to the shutter blade driving ring 16. The link 13 is maintained in engagement with the pin 15 by means of a spring 14, in the well-known manner. A clearance slot 2a is provided in the shutter base plate 2, through which the pin 15 extends. The shutter blades 17, of which only one is shown in the figures for reasons of clarity of illustration, are positioned on the driving ring 16 about pivot pins 18 and are further provided with slots 17a (FIG. 9) in which are accommodated fixed pins 19. Upon running down of the driving disk 4, which takes place in a clockwise direction is indicated by the arrow in FIG. 1, the shutter driving ring 16 has imparted to it a reciprocating motion whereby the shutter blades 17 are first opened, and after having reached a fully opened position, are again closed. This operation of the shutter drive mechanism and shutter blades is well understood in the art.

In accordance with the invention there is provided a novel control and release mechanism by which a positive correlation is effected between the adjusting movement of the abutment 10 for the auxiliary spring 6 and the release of the shutter driving disk 4, the latter occurring only after virtual completion of the adjusting movement of the abutment. By the invention, the actuation of the shutter or camera release serves to release or render inoperative the retainer means which holds the abutment 10 in its starting position, and thereafter a pivotally movable actuator member which is drivingly connected to the abutment and hingedly connected to the latch means for the shutter driving disk is pivotally shifted under the action of the auxiliary driving spring to an adjusted position which determines the adjusted position of the abutment 10. The adjusted position of the actuator member is determined by impingement of a stop provided thereon with a setting cam or stepped edge provided on the camera setting member. After such impingement, which positions the abutment in the desired adjusted position, the actuator member carries out a different pivotal movement now utilizing the said impinging stop as an axis, during which second pivotal movement the latch for the shutter driving disk is released and rendered inoperative, thereby releasing the driving disk for its running down movement. Further, a fixed stop is provided in the shutter housing, which functions to prevent or limit the second pivotal movement of the actuator member, after the shutter driving disk has been released.

The shutter or camera release member, in the illustrated embodiments of the invention, comprises an angle lever or bell crank 20 which is pivotally mounted about an axis 21 provided on the shutter base plate 2 and is biased in a clockwise direction by a spring 22. The lever 20 has a bent arm or lug 20a which passes through the rear wall of the shutter housing and by means of which the lever 20 is connected in a well-known manner (not shown for reasons of clarity of illustration) to the manually operable camera or shutter release device.

The release lever 20 serves, as already stated, to release the retainer means for the abutment 10 of the auxiliary spring 6. The said retainer means comprises a two-arm lever 23 which is pivotally movable about an axis 24 provided on the shutter base plate 2, and is biased in a clockwise direction by a spring 25. One arm 23a of the lever 23 serves to retain the abutment 10 in its starting position which corresponds to the position of greatest stress of the auxiliary spring 6 when the shutter is cocked. For such retention, the arm 23a engages a bent portion or lug 10a provided on the abutment 10, as shown in FIG. 1. The other arm 23b of the lever 23 is pivotally drivingly connected through an intermediary means to the release lever 20. This is effected by the use of a link 26 which is pivotally connected by a pin 27 with the lever arm 23b, and which has a pin-and-slot connection 28, 26a with the lever 20. The latch which serves to retain the driving disk 4 of the shutter in its cocked position is also constituted, as shown in the illustrated embodiment of the invention, as a two-armed lever 29 pivotally mounted on a pin 30 provided on the shutter base plate 2 and biased in a counterclockwise direction by a spring 31. One arm 29a of the lever 29 has an arresting lug 29b which is cooperable with the projection 4b provided on the driving disk 4 whereby the latter may be retained in the cocked position as shown in FIG. 1 by the latch 29. Pivotally connected to the other arm 29c of the latch 29 is a setting and actuating lever 32 (also herein called a "pivotally movable actuator member") arranged for driving connection with the abutment 10 for the auxiliary spring 6. The lever 32 has a fork-shaped end 32a which receives a pin 33 fixedly carried by the abutment 10.

Further, the actuator member 32 has a stop pin 340, by means of which it engages a control cam 34a of an exposure time setting ring 34 (FIGS. 1–4, 9 and 10) after the abutment 10 has been released by suitable counterclockwise turning of the retainer lever 23. Such shifting and impingement of the stop pin 340 is powered by the auxiliary spring 6 which acts on the abutment 10, as will be understood. The cam 34a serves to set or define the adjusted operative position of the abutment 10. That is, it determines the amount of pre-stress which the auxiliary spring 6 experiences in order to obtain a specific exposure time. The lowest step of the cam 34a corresponds to the minimum value of pre-stress, the highest step corresponds to the maximum value of pre-stress, and intermediate portions of the cam provide intermediate values of pre-stress, as determined by the rotative settings of the setting ring 34.

Figure 10:
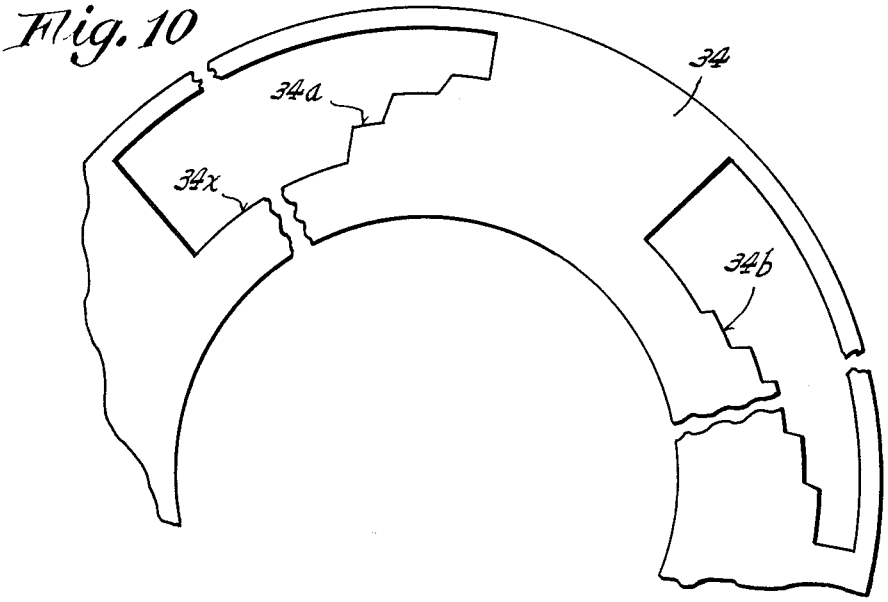
FIG. 10 is a fragmentary diagrammatic view, on an enlarged scale, of a portion of the exposure time setting member of the shutter construction, on which member there are provided the control cams for effecting the adjusted operative position of the abutment for the auxiliary spring and also for setting the exposure time escapement mechanism.

Also provided on the exposure time setting ring 34 is a setting cam or stepped edge 34b which is used to set an exposure time escapement mechanism of a well-known kind (FIGS. 9, 10). The steps of the cams or edges 34a and 34b are so mutually arranged in the illustrated embodiment of the invention that a change of the pre-stress of the auxiliary spring 6 in the direction toward the maximum value takes place in the range of the three shortest exposure times, as for example the times 1/250 second, 1/500 second, and 1/1000 second, whereas no change in the pre-stress of the auxiliary spring 6 takes place upon setting for longer exposure times, as for example times of 1/125 second and longer. For these longer exposure times the auxiliary spring 6 remains in its position corresponding to the minimal pre-stress, for example a pre-stress of 0.

Depending upon the structure and transmission ratios of the exposure time escapement mechanism, the auxiliary spring 6 might also become more or less operative at the longer exposure times in order to avoid critical operative paths of the escapement mechanism, that is, to avoid a short operative path of such mechanism, and to produce an optimum of accuracy and constancy of the exposure times. In such case, the portion 34x of the control cam 34a which in the figures runs concentrically with the axis of rotation of the exposure time setting ring 34 would also have corresponding steps.

The exposure time escapement mechanism which cooperates with the setting cam 34b of the exposure time setting member 34 is constructed in a well-known manner and is shown diagrammatically in FIG. 9. It comprises an upper bearing plate 35 which is visible in the figure, and a lower bearing plate (which is not seen). Between such plates there are arranged different gear drive members (not shown for reasons of clarity of illustration) of the escapement mechanism. The drive of the mechanism is effected in a well-known manner by means of a toothed segment 36. The segment 36 is pivotally movable about an axis 37, having a path of movement between the two bearing plates, and comprises an arm 36a arranged for disposition in the path of movement of the lug 4a of the driving disk. In addition, the toothed segment 36 has a pin 38, by means of which it engages the setting cam 34b under the action of a spring 39.

The method of operation of the above described driving device is as follows:

With the shutter in the cocked condition as shown in FIG. 1, the releasable retainer lever 23 will be pivoted in a counterclockwise direction in response to counterclockwise turning movement of the shutter release lever 20. This movement is effected by means of the connecting link 26, and the arresting arm 23a of the lever 23 becomes disengaged from the abutment lug 10a of the abutment 10 whereupon the latter is free to move under the urging of the auxiliary spring 6. In consequence, the abutment 10 now turns in a counterclockwise direction. The actuator member 32 is thereby shifted pivotally in a clockwise direction about the pivot pin 40, by virtue of the pin-and-slot connection 32a, 33 between the abutment and member. The stop pin 340, moving with the actuator member 32 now engages the cam 34a of the exposure time setting ring 34 after a longer or shorter rotary movement of the abutment 10, depending on the setting of the exposure time setting ring. Upon the pin 340 impinging on the cam 34a the abutment 10 will have reached virtually its adjusted operative position. The engagement of the stop pin 340 with the control cam 34a now has the result that the actuator member 32 carries out a different pivotal movement, this being also in a clockwise direction but now about the stop pin 340 as an axis. During such second pivotal clockwise movement, the arresting lever or latch 29 which is connected to the actuator 32 is also shifted clockwise, thereby to disengage the arresting lug 29b from the projection 4b of the driving disk 4. Immediately after the driving disk 4 has been thus released, an extension of the pin 40 which serves as the pivotal connection to the latch 29 moves into engagement with a fixed stop 41 provided in the shutter housing 2, thereby halting the second clockwise pivotal movement of the actuator 32 and in consequence halting the adjusting movement of the abutment 10. This action is illustrated in FIGS. 2, 3 and 4.

From the foregoing explanation it will be seen that special, costly synchronizing devices are not required in a shutter as constructed in accordance with the invention, for the purpose of obtaining a reliable and positive correlation between the adjusting movement of the abutment 10 for the auxiliary spring 6 and the release of the driving member for the shutter, in shutter constructions of the instant type. Rather, an advantageous sequential operation of the abutment 10 and drive member 4 is obtained in a surprisingly simple, completely positive manner which does not require any appreciable additional expense, in that the auxiliary spring itself is used for effecting the synchronizing.

The driving disk 4 of the shutter, having been released by the arresting lug 29b, now starts to run down in a clockwise direction under the action of the main spring 5 and also the auxiliary spring 6. This causes, by means of the driving link 13 and the shutter blade driving ring 16, the shutter blades 17 first to open and then, having reached their opened positions, the duration of which is determined, with the escapement mechanism operative, by the length of the engagement between the toothed segment 36, 36a and the bent portion 4a of the driving disk 4, to again close.

After the driving force of the auxiliary spring 6 has been delivered to the running driving disk 4 the invention provides for the automatic return of the abutment 10 from its adjusted operative position to the starting position shown in FIG. 1. This is accomplished, in accordance with the invention, by means of a uni-laterally acting separable driving connection provided between the abutment 10 and the driving disk 4. The said driving connection comprises, in the illustrated embodiment of the invention, the same bent portion or lug 4a of the driving disk 4 which cooperates with the toothed segment 36, 36a of the exposure time escapement mechanism, in cooperation with the arm 10b provided on the abutment 10. The mode of operation of the separable uni-laterally acting driving connection is apparent from FIGS. 1 to 5, as follows:

During the setting movement of the abutment 10 into its adjusted operative position as determined by the control cam 34a, the arm 10b is shifted with respect to the bent portion or lug 4a of the driving disk 4, which latter is retained in its cocked position. Further, the driving disk 4 upon release by the latch 29 also executes a relative movement with respect to the abutment 10, the size or extent of said movement being determined by the particular adjusted operative position of the abutment. During this relative movement, the auxiliary spring 6 delivers its driving force to the driving disk 4. The said relative movement is terminated, as soon as the lug 4a impinges, during the running down of the driving disk 4, on the arm 10b of the abutment 10, thereby establishing the driving connection between these two members. This has the effect that the driving disk 4 and the abutment 10 are now moved as a unit, under the sole power of the main spring 5, the abutment 10 reaching its starting position when the driving disk 4 is in the position corresponding to the non-cocked state of the shutter (FIG. 5).

The abutment 10 is retained in its starting position by the arm 23a of the arresting lever or retainer means 23. If the driving disk 4 is now moved into the cocked position shown in FIG. 1 from the run down position of FIG. 5 by means of the cocking shaft 3, the auxiliary spring 6 is cocked simultaneously.

The above-described separable uni-laterally acting driving connection between the driving member 4 and the abutment 10 of the auxiliary spring 6 insures a complete return of the abutment to its starting position in an extremely simple and uncomplicated manner and without the necessity for additional structural members or additional space. This is clearly apparent from the figures of the embodiment, in which the separable driving connection comprises the bent portion 4a provided on the driving member 4 and constituting already the support for the auxiliary spring 6 on the one hand, and an arm 10a on the other hand, provided on the abutment 10 for the auxiliary spring.

In connection with the above described method of setting of the auxiliary spring 6 and method of release of the shutter drive member, the separable driving connection between the abutment 10 for the auxiliary spring and the driving member 4 produces optimal conditions for a shutter of the initially described kind. In addition, the separable driving connection has utility in all shutters of this kind, since it solves in a surprisingly different manner the problem of returning the abutment of the auxiliary driving spring to its starting position.

We claim:

1. In a photographic camera, in combination, a shutter drive member; a main spring for driving said member; an auxiliary spring for driving said member; a movable abutment engaged by one end of the auxiliary spring; releasable retainer means for releasably holding the abutment in a starting position (corresponding to the condition of maximum stress of the auxiliary spring when the shutter drive member is cocked); means responsive to operation of the camera release, for releasing said retainer means to free the said abutment for adjusting movement under the action of the auxiliary spring; a setting member having a cam; shutter drive member release means comprising a pivotally movable actuator member drivingly connected to the abutment, a stop on the actuator member engageable with said cam, for halting the freed abutment in different adjusted positions; and a latch for releasably holding the shutter drive member cocked; said release means being powered by the said auxiliary spring for effecting release of said latch after the abutment has been adjustably positioned by engagement of said stop with said cam, said release being accompanied by pivotal movement of the actuator member about its stop as an axis; and a fixed stop, preventing further movement of the actuator member after release of the latch has been effected.

2. A camera as in claim 1, in which there is means including a separable unilateral driving connection between the said abutment and shutter drive member, for effecting return of the abutment to its starting position in response to running-down movement of the drive member.

3. In a photographic camera having a shutter mechanism and an exposure time setting member, the improvement of a shutter drive means including a main drive means and an adjustable auxiliary drive means, said auxiliary drive means including means adapted to be cooperatively associated with said setting member for determining the adjusted positions thereof, means for retaining each of said main and auxiliary drive means in their respective cocked positions, means for effecting the release of said auxiliary drive means upon actuation of a camera release, and means for automatically effecting the release of said main drive means only after the auxiliary drive means has attained its adjusted positions as determined by the setting of said setting member; and means defining a separable unilateral driving connection between said main drive means and auxiliary drive means for effecting return of the auxiliary drive means to its starting position in response to the running down movement of the main drive means, said means responsive to the operation of said auxiliary drive means includes an actuator drivingly connected to said auxiliary drive means, said actuator being pivoted about one axis to effect the adjusted positioning of said auxiliary drive means, and pivoted about a second axis spaced from said first axis to effect release of said main drive member.

4. In a photographic camera having a shutter means, an exposure time setting member and a shutter release, the improvement of a shutter drive means including a main shutter drive means and a cooperating adjustable auxiliary abutment drive means, means for retaining said abutment means in releasable cocked position, means operatively associated with said camera release for effecting the release of said retaining means for said abutment means upon the actuation of said camera release, and an actuator drivingly connected with said abutment drive means, a releasable latch for retaining said main shutter drive in cocked position pivotally connected to said actuator, a stop fixed to said actuator disposed between its connection to said abutment drive means and its pivoted connection to said latch means, said stop being adapted to engage with said setting member to determine the adjusted position of said abutment drive means upon actuation of said camera release, and said actuator being pivoted about its stop when the adjusted positioning of said abutment drive means is determined by said setting member to effect operation of said latch to release said main drive means.

References Cited in the file of this patent
UNITED STATES PATENTS

| | | |
|---|---|---|
| 2,925,024 | Junghans | Feb. 16, 1960 |
| 3,014,418 | Hahn | Dec. 26, 1961 |